United States Patent [19]

Iwatsuki et al.

[11] Patent Number: 4,767,827
[45] Date of Patent: Aug. 30, 1988

[54] ARTIFICIAL HAIR COMPRISING POLY ALPHA AMINO ACID HAVING PENDANT MERCAPTO OR DISULFIDE GROUPS

[75] Inventors: Makoto Iwatsuki; Masao Honma; Mikio Kayama, all of Kawasaki, Japan

[73] Assignee: Ajinomoto Co., Inc., Tokyo, Japan

[21] Appl. No.: 928,462

[22] Filed: Nov. 10, 1986

[30] Foreign Application Priority Data

Nov. 8, 1985 [JP] Japan ................................. 60-250336

[51] Int. Cl.$^4$ ............................................. C08G 69/48

[52] U.S. Cl. ...................................... 525/420; 132/53; 528/328

[58] Field of Search .......................... 525/420; 528/328

[56] References Cited

U.S. PATENT DOCUMENTS 4,385,169  5/1983  Kato et al. ........................... 525/420

Primary Examiner—Harold D. Anderson
Attorney, Agent, or Firm—Oblon, Fisher, Spivak, McClelland & Maier

[57] ABSTRACT

Artificial hair comprising a polyamino acid having a degree of polymerization of 50–10,000, and having pendant mercapto or disulfide groups.

13 Claims, No Drawings

ARTIFICIAL HAIR COMPRISING POLY ALPHA AMINO ACID HAVING PENDANT MERCAPTO OR DISULFIDE GROUPS

BACKGROUND OF THE INVENTION

1. Field of the Invention

The present invention relates to artificial hair which is made of a polyamino acid, which has a degree of polymerization of about 50–10,000 and which, moreover, has pendant mercapto or disulfide groups.

2. Description of the Background

Of the many inevitable consequences of human aging, hair thinning or hair loss is, perhaps, one of the most apparent. While many adults adjust to life having less or no hair, others resort to wearing wigs in order to restore a sense of self-confidence and to be able to participate fully in society.

While hair thinning and hair loss is, perhaps, more characteristic of the male response to aging, an enormous market exists for hair wigs for women, who habitually wear wigs as a matter of fashion as the time, place and occasion require.

Thus, due to both cosmetic and psychological reasons, the hair wig industry for both men and women has grown rapidly in recent years, particularly so for men's hair wigs.

To date, human hair has been widely used in the construction of wigs. However, several difficulties are presented with the use human hair.

First, at present, women's hair styles have changed and as a result, women's hair is now worn fashionably short. Moreover, women's hair is often worn permed, such that it is no longer adequate to merely us straight long human hair in wig construction.

Secondly, in order to use human hair in wig construction, the hair must be subjected to many treatment steps starting with the removal of cuticles covering the surface of the hair. Additionally, other treatments are needed as well as sterilization, decoloration, coloring, and lustering, all of which tend to change the hair.

Thirdly, due to the uneven length and size of human hair, it is difficult to mechanize the setting of human hair on a wig base, and each hair must be set thereon by hand. Accordingly, enormous costs and much time are required in wig production. The inability to readily mechanize this process is, perhaps, the most relevant factor in wig expense and, moreover, tends to discourage wig use.

For the above reasons, synthetic fibers of the acryl type have been proposed as materials for wigs instead of human hair and to some extent these synthetic fibers have been used. However, these synthetic fibers exhibit the following disadvantages:

(1) The synthetic fibers are fused by heat so that special techniques and devices are required for styling and maintenance of hair wigs or hair pieces.

(2) The synthetic fibers have poor heat resistance so that if a person who wears a wig uses a hair drier carelessly, the wigs might become unusuable.

(3) The synthetic fibers fail to realize and maintain styling by gentle oxidation-reduction treatment (cold perm), as is possible with human hair.

(4) On the other hand, it is difficult for the wearer to change styling depending upon mood and, moreover, such wigs produce an unnatural feeling.

(5) Polyvinylidene chloride and a polyacrylonitrile are both quite dissimilar to the proteins which constitute human hair, such that the luster and touch of wigs made from such synthetic fibers are different from wigs made of human hair. Further, an image of wearing artificial hair is stroingly attached to the wearer and is perceived by those around him.

Hence, a need clearly continues to exist for a material which can be used in the construction of human wigs, which has the look and feel of human hair and which also is capable of being easily styled and maintained.

SUMMARY OF THE INVENTION

Accordingly, it is an object of the present invention to provide an artificial hair which can be used advantageously in the production of human wigs.

It is also an object of the present invention to provide a human wig containing the above artificial hair.

Moreover, it is further an object of this invention to provide a method of making the artificial hair described above.

According to the present invention, the foregoing and other objects are attained by providing an artificial hair containing a polyamino acid having a degree of polymerization of 50–10,000 having pendant mercapto groups or disulfide groups attached thereto.

DETAILED DESCRIPTION OF THE PREFERRED EMBODIMENTS

Although human hair has the several aforesaid defects as a raw material for hair wigs or hair pieces, human hair is still used widely. This is because, apart from the materialistic identification that wig wearers have with human hair, human hair has strong resistance to heat and does not fuse when heated. Moreover, as human hair is composed of protein, arrangement and styling by brushing is easy and, the styling can be maintained upon wearing or even after washing hair. These advantages elude all other materials such as synthetic fibers.

These properties are characteristic of human hair which is composed of protein. In particular, fibrous polypeptide chains assume a helical $\alpha$-helix structure. When hair having a $\alpha$-helix structure is stretched by such stresses as hair brushing, for example, the hair is thereby caused the to assume a $\beta$-type zigzag structure. Thereby, intermolecular or intramolecular hydrogen bonds of the polypeptide chains are readily broken by moisture, heat or the application of external stress to compensate for various distortions applied, whereby the aforesaid easy arrangement of styling is realized.

These polypeptide chains are composed of various amino acids, among which cystine has a disulfide group. Namely, cystine facilitates cross-linking of two polypeptide chains and can prevent a gap between the polypeptide chains due to covalent bonding therebetween. Accordingly, hair style maintenance can be easily realized.

As a result of investigations on artificial hair similar to human hair and which is usable as a raw material particularly for the construction of hair wigs or hair pieces, it has now been discovered that artificial hair containing a polyamino acid having a polymerization degree of 50 to 10,000, having pendant mercapto groups or disulfide groups as side chains thereof, is a most suitable raw material for the construction of human wigs and hair pieces.

The present polyamino acid has a polypeptide structure which is a synthetic high molecular weight substance composed of amino acids similar to human hair having a high heat resistance and which does not fuse from room temperature to about 300° C.

In order to be functionally equivalent to human hair, disulfide groups can be introduced between the polypeptide chains. That is, by the use of a polyamino acid having pendant mercapto groups or disulfide groups as side chains thereof, artificial hair is provided which is very similar, structurally, to human hair and which can completely avoid the foregoing defects. The artificial hair of the present invention has a heat resistance superior to that of human hair, hair styling can be easily arranged and styling can be maintained by cold perm which is not possible using conventional synthetic high molecular weight substances.

The arrangement by hair styling of the artificial hair of the present invention with cold perm and its maintenance can be realized in a manner similar to the permanent waving of human hair. The pendant mercapto groups need no treatment; the pendant disulfide groups are treated with a mild reducing agent such as thioglycolic acid, for example, which is used as a cold perm solution to be converted to mercapto groups.

Next, an excess of the reducing agent is removed by rinsing to discontinue the reduction. After arranging the hair to a desired style, the artificial hair is finally treated with a mild oxidizing agent for cold perming, such as potassium bromate. By this treatment, the mercapto groups are oxidized and the final style is fixed due to cross-linking between the peptide molecular chains. The style can be maintained even by brushing or washing the hair or even with environmental changes due to wearing.

The polyamino acid that can be used as the artificial hair, of course, must be spinnable in a fibrous form and have a sufficient strength and durability. For these purposes, the polymerization degree must be at least in a range of 50 to 10,000, preferably 100 to 5,000.

Additionally, the obtained fibers can be stabilized in several solvents by lengthening, and any unevenness at the surface of the fiber can thereby be removed.

As a process for producing polyamino acids having a high molecular weight, polycondensation of N-carboxy-α-amino acid anhydrides can be used and has been used industrially.

Fibers, films or powder of poly-γ-methyl-L-glutamate have also been prepared by the above-noted method.

To prepare the polyamino acid having pendant mercapto groups or disulfide groups which is used in the present invention, it is preferred that (1) polyamino acids consisting of dibasic acidic amino acid ω-esters or containing the esters as a component thereof are changed to activated esters and then the activated esters are subjected to aminolysis with aminoethanethiol or cysteamine; or (2) N-carboxy-α-aminoacid anhydrides are synthesized from dibasic acidic amino acid ω-activated esters, the activated esters are polycondensed and then, all or a part of the polymers or at least one of the polymers, i.e., as a monomeric unit constituting the polymer, is subjected to aminolysis with aminoethanethiol or cysteamine.

That is, when cysteine is used as the amino acid for synthesis of the polyamino acid having mercapto groups, after protecting the mercapto group of cysteine, it is possible to synthesize N-carboxy-α-amino acid anhydride. Further, when cystine is used as an amino acid containing a disulfide group, crosslinking occurs between the peptide molecular chains upon the polycondensation of N-carboxy-α-amino acid anhydride, due to the bifunctionality present so that a polyamino acid which can be used as artificial hair cannot be obtained.

When cysteine is used, various protective groups for the mercapto group can be used which are those used routinely in peptide synthesis, such as S-benzyl, and S-p-methoxybenzyl, for example. However, when the protective group is again removed after the polycondensation, Na/NH$_3$, hot trifluoroacetic acid, or hydrogen fluoride, for example, should be used.

The present polyamino acid for artificial hair has a high polymerization degree so that reactivity is reduced and severer conditions are required for removal of the protective groups. For this reason, the main chain of the polymer is often broken and it is impossible to prepare polyamino acids suited for artificial hair.

The aforesaid polyamino acid that can be converted into the activated ester collectively refers to a polyamino acid consisting of a dibasic acidic amino acid ω-ester alone or one containing the dibasic acidic amino acid ω-ester as its component and specifically refers to poly-γ-methyl-L- or D- or DL-glutamate, poly-γ-ethyl-L or D- or DL-glutamate, poly-γ-propyl-L- or D- or DL-glutamate, poly-β-methyl-L- or D- or DL-aspartate, poly-β-ethyl-L- or D- or DL-aspartate, poly-β-propyl-L- or D- or DL-aspartate; and a polyamino acid containing as a monomer, constituting a polymer, one or more of ω-esters of other alcohols, for example, butyl alcohol and amyl alcohols, a benzyl alcohol, for example.

Conversion of the polyamino acids into the activated esters can be performed by the process of Tanaka et al (Journal of the Chemical Association, Japan, 1973, 1770–1775). The aminolysis of the polyamino acid activated esters with aminoethanethiol or cysteamine can be performed based on the process of Kudo et al (J. of Polymer Sci.: Polymer Chemistry Edition, Vol. 17, 789–796 (1978)).

Further the dibasic acidic amino acid used when preparing the aforesaid dibasic acidic amino acid ω-ester refers to L- or D- or DL-glutamic acid and L- or D- or DL-aspartic acid. The activated esters may be prepared according to the activated esterification used in conventional peptide synthesis, by esterifying these acids with various esters such as p-nitrophenyl ester, for example, or N-hydroxsuccinimide. However, it is economical to use ethylene chlorohydrin, secondary-propylene chlorohydrin, ethylene cyanhydrin or β,β,β-trichloroethanol.

Fibers, films or powder of the polyamino acid having pendant mercapto groups can be subjected to aminolysis and extruded into N,N-dimethyl-formamide solution into a non-solvent for the polymer such as water, or alcohol, for example.

The present invention will now be further illustrated by reference to the following examples, which are provided only for purposes of illustration and are not intended to limit the present invention.

The polyamino acid having a polymerization degree of 50 to 10,000 which has pendant mercapto groups or disulfide groups can be molded into fibers having uniform length, size and shape. The polyamino acid is chemically similar to human hair and as a material is suitable for use as artificial hair. The polyamino acid has pendant mercapto groups or disulfide groups so that when it is used as a raw material for a hair wig or a hair piece, it is highly safe to the skin and can be subjected to oxidation-reduction treatment (permanent wave treatment) as is the case with human hair.

EXAMPLE 1

Fibers of poly-γ-methyl-L-glutamate having a size of 60 denil and a circular cross-section were prepared by the method described in Published Examined Japanese Patent Application No. 28787/68.

Next, for the purpose of ester exchange of a part of the methyl groups of the side chains of polyglutamic acid into chloroethyl groups, the following operation was performed in the fibrous state. One gram of the obtained fibers was wound and fixed on a frame, which was immersed in a mixture of 30 ml of dichloroethane, 27 g of ethylene chlorohydrin and 0.72 g of sulfuric acid to react at 60° C. for 15 hours. After completion of the reaction, rinsing was performed using ultrasonic waves in a methanol bath and then in an aqueous bath. The rinsing was repeated until the rinsing liquid became neutral, followed by drying.

The ester exchange rate was determined by the change in weight prior to and after the reaction and by the chlorine content. This rate was approximately 60%.

Next, for aminolysis, 2 g of thioethanolamine was dissolved in 50 ml of methylene chloride. The fibers fixed on the frame obtained by the aforesaid ester exchange was immersed in the solution to react at 20° C. for 24 hours. Rinsing was performed with ultrasonic waves in a methanol bath and then in an aqueous bath. The rinsing was repeated until the rinsing liquid became neutral. By the aminolysis, the chloroethyl ester groups of the polyglutamate were partly changed to thioethanolamide groups.

With respect to the fibers after the treatment, the presence of sulfur was confirmed by X-ray fluorometry and at the same time, the rate of carrying the thioethanolamide group per the glutamic acid residue was determined by elemental analysis of C, H, N and S. The rate of carrying the thioethanolamide groups was 17%. As the result, an artificial hair of the polyamino acid having pendant mercapto groups was obtained.

EXAMPLE 2

Poly-γ-methyl-L-glutamate fibers weighing 0.455 g were wound around and fixed on a frame, which was immersed in a mixture of 60 ml of dichloroethane, 2.2. g of ethylcyanohydrin and 0.47 g of sulfuric acid to react at 60° C. for 15 hours. After completion of the reaction, rinsing was performed with ultrasonic waves in a methanol bath and then in an aqueous bath. The rinsing was repeated until the rinsing liquid became neutral, followed by drying. The ester exchange rate was 29%. The fibers were immersed in 50 ml of methylene chloride and 1.0 g of thioethanolamine to react at room temperature for 64 hours. Rinsing was then performed with ultrasonic waves in a methanol bath and then in an aqueous bath. The rinsing was repeated until the rinsing liquid became neutral. The rate of carrying the thioethanolamide groups per the glutamic acid residue was determined by elemental analysis of C, H, N and S and showed 2.8%.

EXAMPLE 3

The procedure was repeated as in Example 1 except that 2 g of 2,2'-dithiobisethylamine was used in place of thioethanolamine used for the aminolysis. With this the procedure, the chloroethyl ester groups of the polyglutamate were converted to 2,2'-dithiobisethylamide to give polyamino acid fibers partly having disulfide groups. Determination of the rate of carrying of the 2,2'-dithiobisethylamide groups per two glutamino acid residues by elemental analysis of C, H, N and S showed 15.6%. As the result, artificial hair of the polyamino acid having pendant disulfide groups was obtained.

EXAMPLE 4-6

A test was performed as follows to determine if permanent waving is possible.

The fibers were wound around a rod in a tension of 70 g and immersed in a first liquid for permanent waving for 15 minutes. Then the rod was immersed in a second liquid for permanent waving for 15 minutes. The fibers were removed from the rod and rinsed with water in a free state followed by natural drying.

For purpose of comparison, poly-γ-methyl-L-glutamate fibers obtained by the method of Published Examined Japanese Patent Application No. 28787/68, human virgin hair (hair taken from a girl of 10 years old) and acryl fibers widely used as artificial hair for hair wig were subjected to the permanent wave treatment in a similar manner. A waving effect was determined by the following equation:

$$\text{Waving effect} = \frac{\text{Diameter of wave after perming (mm)}}{\text{Diameter of rod used (mm)}}$$

The results are shown in the table below.
First liquid for permanent wave:
6.5% Aqueous solution of ammonium thioglycolate was prepared and its pH was adjusted with ammonia water to 9.2 to 9.6.
Second liquid for permanent wave:
5% Aqueous solution of sodium bromate.

TABLE I

| | Kind of Material | Waving Effect |
|---|---|---|
| Example: | | |
| 4 | Artificial hair having mercapto groups at the side chain thereof, obtained in Example 1 | 3.7 |
| 5 | Artificial hair having mercapto groups at the side chain thereof, obtained in Example 2 | 3.7 |
| 6 | Artificial hair having disulfide groups at the side chain thereof, obtained in Example 3 | 3.5 |
| Comparative Example: | | |
| 1 | Poly-γ-methyl-L-glutamate fibers | no wave |
| 2 | Human hair | 3.3 |
| 3 | Acryl fibers | no wave |

EXAMPLES 7-14

Fibers of poly-γ-methyl-L-glutamate (PMG), (1 g,[η]=2.08) having a size of 108 denier (50-120 μmφ) and a circular cross-section were prepared under the following conditions: a diameter of dope vomiting nozzle: 0.6 mmφ, vomiting rate; Ca 3 ml/min (10.6 m/min.), solidifying solvent and its bath length; tetrachloroethylene, 3.5 m length.

Poly-γ-methyl-L-glutamate fibers weighing 1 g were wound around and fixed on a frame, which was immersed in a mixture of 50 g of dichloroethane, 12.5 g of ethylcyanohydrin and 0.47 g of sulfuric acid to react at 60° C. for 10-17 hrs. After completion of the reaction, rinsing was performed in 30 ml of methanol with three times. The rinsing was repeated until the rinsing liquid became neutral, followed by drying. The fibers were immersed in 50 ml of methylene chloride and 0.75 g of cysteamine to react at room temperature for 24 hours. Rinsing was then performed in 30 ml of methanol three times to obtain artificial hair followed by drying. The results and experimental conditions are shown in Table II.

TABLE II

| No. | PMS dope concentration (%)/solvent | lengthening rate of PMG fiber (%) | Reaction time of ester-exchanged (hour) | Solvent of amidation | Waving effect |
|---|---|---|---|---|---|
| 7 | 8.4/tetrachloroethylene:EDC = 3:7 | 50 | 14 | methanol | wave |
| 8 | " | 60 | " | " | " |
| 9 | 7.2/tetrachloroethylene:EDC = 4:6 | 50 | " | " | " |
| 10 | " | " | 10 | $CH_2Cl_2$ | " |
| 11 | " | 60 | " | " | " |
| 12 | " | " | 15 | " | " |
| 13 | " | 80 | " | " | " |
| 14 | " | 100 | " | " | " |

EXAMPLES 15-17

Fibers of poly-γ-methyl-L-glutamate (PMG) (F type [η]=2.08) having a size of 173 denier (50-120 μmφ) and a circular cross-section were prepared with or without lengthening the fibers. Then PMG fibers weighing 1 g were wound around and fixed on a frame, which were immersed in 50 ml of methanol and 0.75 g of cysteamine to react at room ptemperature for 6 days or at 60° C. for one day. Rinsing was then performed in 30 ml methanol twice followed by drying. The only non-lengthened fibers in this precedure were made 1.8 times longer. The results and experimental condition were shown in Table III.

TABLE III

| No. | lengthening rate of PMG fiber before reacting with cysteamine (%) | Reacting time and temperature (day °C.) | Tensile force [lengthening rate] (g/fiber) | Waving effect |
|---|---|---|---|---|
| 15 | 80 | 6 room temperature | 134 [20] | Wave |
| 16 | 80 | 1 60 | 170 [26] | Wave |
| 17 | none | 1 60 | 148 [14] | excellent |

EXAMPLE 18

Fibers of poly-γ-methyl-L-glutamate (PMG) (F type [η]=2.08) having a size of 173 denier (50-120 μmφ) and a circular cross-section weighing 0.4 g with or without Roetten-black, were immersed in 50 ml of methanol and 2.3 g of cysteamine to react at 60° C. for 22 hours. Rinsing was performed in 30 ml methanol twice followed by drying then the colored fibers were made 1.6 times longer. The waving effect of the fibers were excellent.

The artificial hair of the present invention can be advantageously used to construct human wigs and hair pieces. Of course, the artificial hair of the present invention can also be used to construct false eyelashes or even false mustaches and beards.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. Artificial hair comprising a poly-α-amino acid having a degree of polymerization of 50-10,000, and having pendant mercapto or disulfide groups.

2. The artificial hair of claim 1, wherein said poly-α-amino acid has a degree of polymerization of 100-5,000.

3. The artificial hair of claim 1, wherein said poly-α-amino acid is prepared by:
   (a) converting one or more poly-α-amino acids consisting of units from one or more dicarboxylic amino acid acid α-esters to an activated ester, and then subjecting at least one monomeric unit of the polymer to aminolysis, thereby introducing said pendant mercapto or disulfide groups; or
   (b) subjecting at least one monomeric unit of one or more poly-α-amino acids consisting of units from one or more dicarboxylic amino acid ω-esters to aminolysis, thereby introducing said pendant mercapto or disulfide groups; or
   (c) converting one or more dicarboxylic amino acid ω-activated esters to a N-carboxy-α-amino acid anhydride, polycondensing the same, and then subjecting at least one monomeric unit of the polymer to aminolysis, thereby introducing said pendant mercapto or disulfide groups.

4. The artificial hair of claim 3, wherein said poly-amino acid which is converted into said activated ester is selected from the group consisting of poly-γ-methyl-L- or D- or DL-glutamate, poly-γ-ethyl-L or D- or DL-glutamate, poly-γ-propyl-L- or D- or DL-glutamate, poly-β-methyl-L- or D- or DL-aspartate, poly-β-ethyl-L- or D- or DL-aspartate.

5. The artificial hair of claim 3, wherein said aminolysis is effected by subjecting the activated ester to thioethanolamine, 2,2'-dithiobisethylamine or cysteamine.

6. The artificial hair of claim 3, which is produced by:
   (a) subjecting poly-γ-methyl-L-glutamate to an ester interchange reaction with ethylene chlorohydrin or ethyl cyanohydrin; and
   (b) subjecting the product of step (a) to aminolysis by reacting the same with thioethanolamine, 2,2'-dithiobisethylamine or cysteamine.

7. The artificial hair of claim 3, which is produced by:
   (a) subjecting fibers of poly-γ-methyl-L-glutamate to aminolysis with cysteamine.

8. The artificial hair of claim 7, wherein said aminolysis is effected in methanol at room temperature for about 6 days or at about 60° C. for about 1 day.

9. The artificial hair of claim 7, the preparation thereof which further comprises, after aminolysis, rinsing the fibers with methanol.

10. A human wig or hair piece, which comprises the artificial hair of claim 1.

11. The artificial hair of claim 7, wherein said fibers of poly-α-methyl-L-glutamate have a size of 173 denier, 50–120 μmφ, and a circular cross-section.

12. A method of producing artificial hair, which consists essentially of a poly-α-amino acid having a degree of polymerization of 50–10,000 having pendant mercapto or disulfide groups, which comprises:

(a) converting one or more poly-α-amino acids consisting of units form one or more dicarboxylic amino acid ω-esters to an activated ester, and then subjecting at least one monomeric unit of the polymer to aminolysis, thereby introducing said pendant mercapto or disulfide groups; or (b) subjecting at least one monomeric unit of one or more poly-α-amino acids consisting of units from one or more dicarboxylic amino acid ω-esters to aminolysis, thereby introducing said pendant mercapto or disulfide groups; or (c) converting one or more dicarboxylic amino acid ω-activated esters to a N-carboxy-α-amino acid anhydride, polycondensing the same, and then subjecting at least one monomeric unit of the polymer to aminolysis, thereby introducing said pendant mercapto or disulfide groups.

13. The method of claim 12, which comprises:

(a) subjecting poly-α-methyl-L-glutamate to an ester interchange reaction with ethylene chlorohydrin or ethyl cyanohydrin; and (b) subjecting the product of step (a) to aminolysis by reacting the same with thioethanolamine, 2,2,'-dithiobisethylamine or cysteamine.

* * * * *